United States Patent [19]

Cavanagh

[11] Patent Number: 4,787,835
[45] Date of Patent: Nov. 29, 1988

[54] NIP INDICATOR FOR CASTING MACHINES
[75] Inventor: Kenneth M. Cavanagh, Warwick, R.I.
[73] Assignee: Marshall and Williams Company, Providence, R.I.
[21] Appl. No.: 148,874
[22] Filed: Jan. 27, 1987
[51] Int. Cl.$^4$ ............................................. B29C 59/04
[52] U.S. Cl. .................................... 425/150; 264/40.5; 264/175; 425/172; 425/367; 425/DIG. 235
[58] Field of Search ............... 425/140, 141, 149, 150, 425/170–172, 328, 367, DIG. 235; 264/40.4, 40.5, 40.7, 175; 73/862.55; 72/199; 241/231

[56] References Cited

U.S. PATENT DOCUMENTS

| | | | |
|---|---|---|---|
| 1,743,302 | 1/1930 | Allen | 425/367 X |
| 2,678,465 | 5/1954 | Schnuck et al. | 425/367 |
| 3,135,018 | 6/1964 | Smith | 425/141 |
| 3,292,208 | 12/1966 | Wood | 425/367 X |
| 3,389,588 | 6/1968 | Reinhardt | 425/DIG. 235 |
| 3,901,635 | 8/1975 | Greenberger | 425/367 X |
| 3,930,774 | 1/1976 | Brand et al. | 264/40.7 X |
| 3,936,258 | 2/1976 | Lake | 425/367 X |
| 4,117,054 | 9/1978 | Salo | 425/172 X |
| 4,137,925 | 1/1979 | Graves et al. | 264/40.7 X |
| 4,519,757 | 5/1985 | Wittkopf et al. | 425/367 X |

Primary Examiner—Richard L. Chiesa
Attorney, Agent, or Firm—Bailey & Hardaway

[57] ABSTRACT

An improvement for casting machines is provided which displays a correct nip measurement based on the relative position of cooperating rolls and the thermal expansion of the rolls.

7 Claims, 2 Drawing Sheets

NIP INDICATOR FOR CASTING MACHINES

BACKGROUND OF THE INVENTION

This invention relates generally to the art of plastic film forming extrusion machines and particularly to a sensing of the nip size as a means of determining the thickness of plastic material being extruded.

Numerous devices have been developed in an attempt to determine nip size and thus allow for adjustments which will assure a constant thickness of material emerging from extruders. Current practice uses a gaging system located downstream of the nip to measure the thickness of the material. This information is fed back to the operator who can then make speed adjustments to compensate for thickness variations detected by the gaging system. Systems are also available to automatically adjust the process on the basis of the thickness measurements.

Other systems have been developed which monitor the pressure on the material being extruded and adjust the nip size in response to changes in pressure.

Examples of such pressure-sensitive nip controllers are disclosed by Smith U.S. Pat. No. 3,135,018 and by Woechener et al. U.S. Pat. No. 4,214,857.

But, no system has been developed which correctly measures the nip size itself so that accurate adjustments can be made.

SUMMARY OF THE INVENTION

It is, therefore, the particular object of this invention to provide the improvement for casting machines of correct measuring of nip size.

This as well as other objects are accomplished in a conventional extrusion machine by providing means for measuring nip size by pivot arm position, means for measuring the temperature of casting rolls, means for calculating thermal expansion of the rolls from the temperatures, means for correcting the positional nip size measurement by adding in the thermal expansion of the rolls, and means for displaying the corrected nip size.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

The drawings illustrate a casting machine with a spring loaded shaft carrying a transformer for measuring nip size by pivot arm position, thermocouples for measuring the temperatures of the rolls, a means for calculating the thermal expansion of the rolls from the temperatures, and a means for correcting the positional nip measurement by adding in the thermal expansion of the rolls.

The present invention offers the ability to precisely measure the nip 9 formed by cooperating rolls 5 and 7. Thermal expansion is taken into account when measuring the nip because the first measurement taken is an indirect positional one; that is, the nip size is first determined by the relative displacement of an arbitrary point, for example A, on the pivot arm 3. Therefore, any dimensional changes which occur in the rolls will change the nip and must be accounted for. It should be noted that other nip indicators can only display the correct nip size if the rolls are at the temperature at which the system was calibrated. Any change in the roll temperatures alters the nip between the rolls. If dimensional changes due to temperature are not taken into account then the displayed value for the nip will be incorrect.

Figure 1:
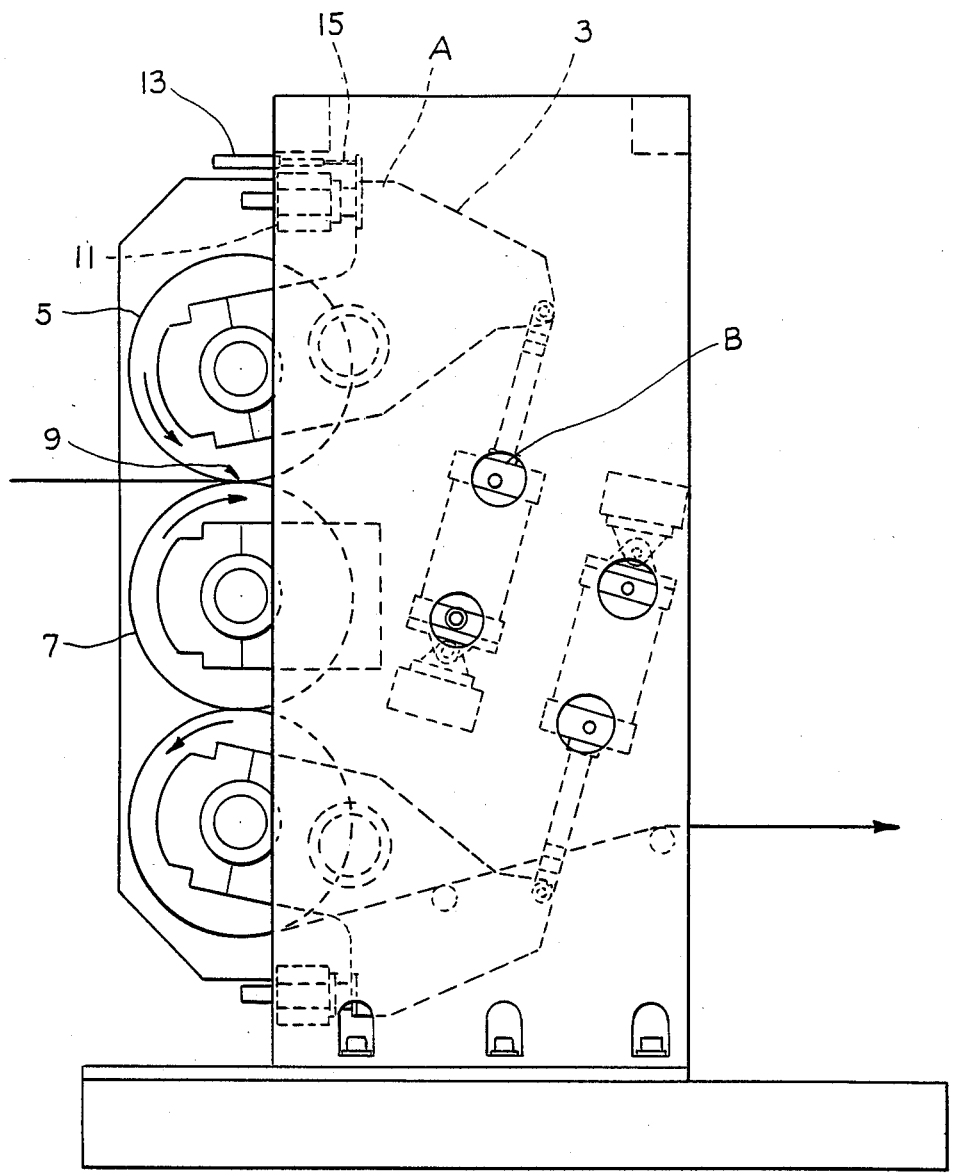
FIG. 1 is a side view of a casting machine with the improvement of this invention.
Figure 2:
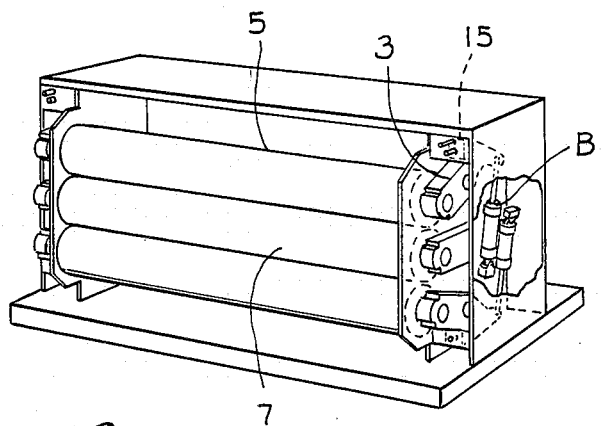
FIG. 2 is a perspective view of an extrusion machine with the improvement of this invention, and FIG. 3 schematically illustrates the electronics of this invention.

The operating apparatus of the present invention is illustrated in FIGS. 1 and 2 as including pivot arms 3 which apply force to one roll 5 in the direction of the other roll 7. Nip 9 is defined between the rolls and an adjustable mechanical stop 11 is provided for maintaining a predetermined minimum positional nip size. Means B for exerting force on the pivot arm is preferably a fluid cylinder.

In operation the position of pivot arm 3 is determined by a linearly varied differential transformer (LVDT) 13 with a spring loaded shaft 15 protruding along its axis. The LVDT is a purchased device which utilizes an external power source for excitation. It produces a low level electrical signal which varies with the displacement of the spring loaded shaft. Thus, a relative positional nip size is sensed by the LVDT as section A of the pivot arm moves against it. The output from the LVDT is fed into the electronics module 17 as is illustrated schematically in FIG. 3.

Figure 3:
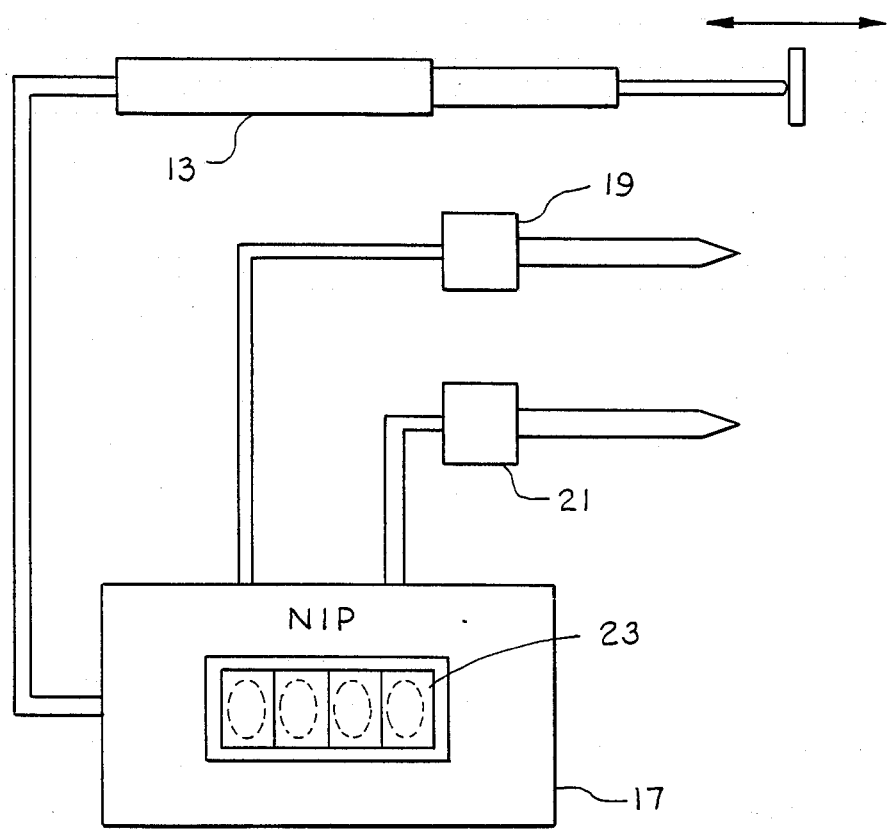

FIG. 3 also represents that the temperature information from each roll is also fed into electronic module 17. Thermal fluid (not shown) circulates within each of the rolls. It is this fluid which expands with increases in temperature that necessitates that the thermal expansion of each of the rolls must be determined and taken into account in order to achieve correct nip measurement. The roll temperatures are preferentially measured by thermocouples 19 and 21, illustrated schematically in FIG. 3. The temperature measurement is taken at the fluid inlet of each roll (not shown).

Thus, the electronics module corrects the positional nip measurement using the roll temperature to calculate the thermal expansion of the rolls. The corrected nip size is then displayed on the LED display 23.

EXAMPLE I

As an illustration of the significance of the thermal expansion of the rolls compared to the positional nip size as measured by the LVDT, it should be noted that the thermal expansion for 16 inch diameter rolls undergoing a temperature change of 100 degrees F would be 0.010 inches. The gap setting typically ranges from 0.005 to 0.250 inches. The range of operating temperatures is from 70 deg. F (ambient) to 400 deg. F. Based on these ranges the thermal expansion, expressed as a percentage of the gap, can be anywhere between 15% to 750%.

While a preferred embodiment of the invention has been described using specific terms, such description is for illustrative purposes only, and it is to be understood that changes and variations may be made without departing from the spirit or scope of the following claims.

What is claimed is:

1. In a casting machine having a nip formed by cooperating rolls with thermal fluid circulating therein, movable toward and away from each other through which material to be compressed is passed, a bank of material feeding into said nip, a pair of fluid cylinders exerting force on a pair of pivot arms, said pivot arms exerting force on one of said rolls relative to the other by exerting force on both ends of one of said rolls in the direction of the other of said rolls and exerting excess force on a pair of adjustable mechanical stops, said mechanical stops blocking said pivot arms for maintaining a predetermined minimum distance between center portions of said rolls, the improvement comprising:
   means for measuring nip size by pivot arm position;
   means for measuring the temperatures of said rolls;
   means for calculating thermal expansion of the rolls from said temperatures;
   means for correcting said positional nip size measurement by adding in the thermal expansion of the rolls; and
   means for displaying the corrected nip size.

2. The improvement set forth in claim 1 wherein the means for measuring nip size by pivot arm position is a spring loaded shaft which protrudes toward a pivot arm in the same alignment as and adjacent to a mechanical stop.

3. The improvement set forth in claim 2 wherein a pressing of the pivot arm against the mechanical stop results in a minimum nip size as measured by the spring loaded shaft.

4. The improvement set forth in claim 3 including a transformer within said spring loaded shaft for transmitting an electrical signal representing said nip size measurement to said means for correcting said nip size measurement.

5. The improvement set forth in claim 1 wherein the temperatures of said rolls are measured by thermocouples in the thermal fluid circulating in each of said rolls.

6. The improvement set forth in claim 5 including transmitting an electrical signal representing said temperature measurements to said means for calculating thermal expansion of the rolls.

7. The improvement set forth in claim 1 wherein the means for calculating the thermal expansions of the rolls is based on the temperatures of the rolls, the size of the rolls, and the composition and thermal properties of the thermal fluid circulating therein.

* * * * *